2,963,322

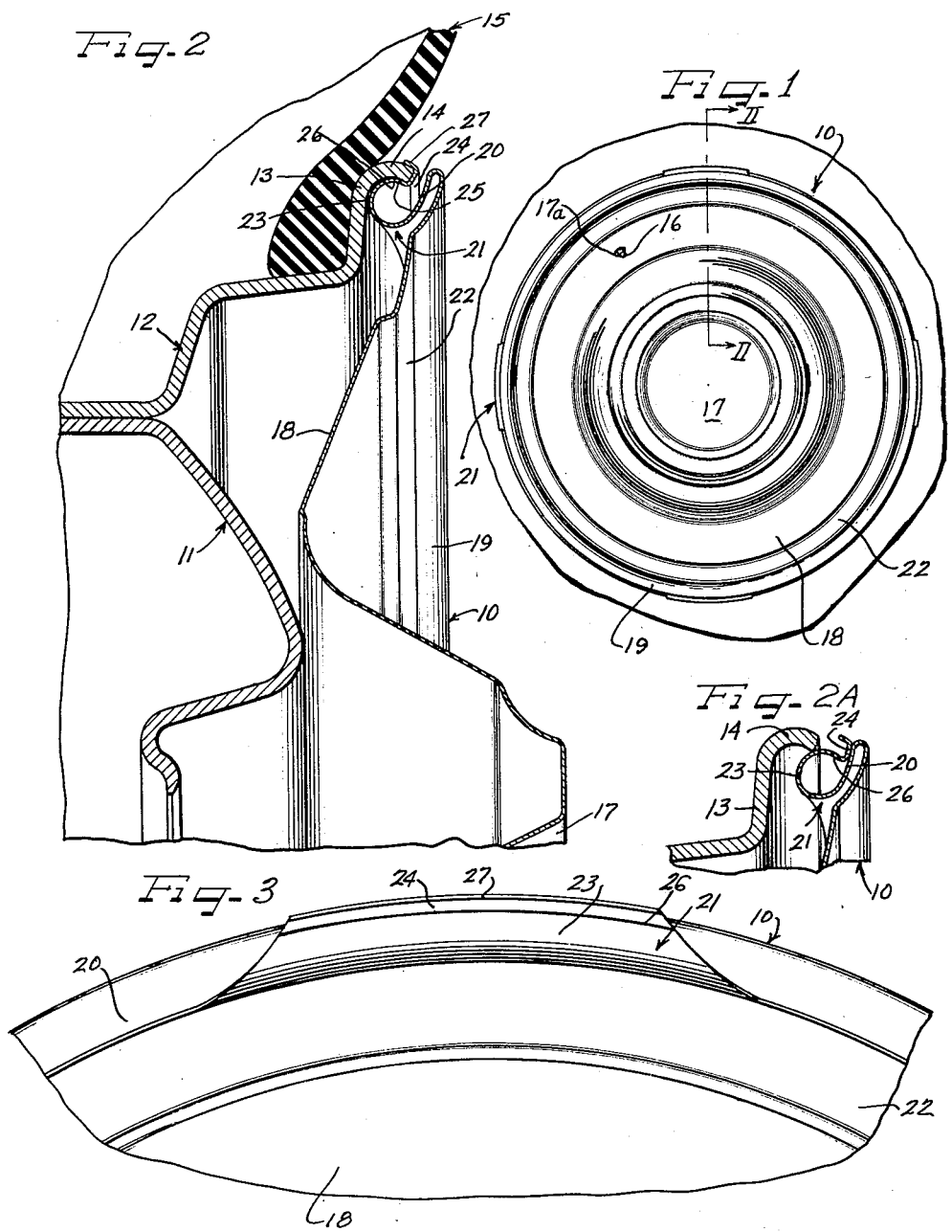

WHEEL COVER

George Albert Lyon, 13881 W. Chicago Blvd., Detroit 28, Mich.

Filed Dec. 7, 1956, Ser. No. 626,852

6 Claims. (Cl. 301—37)

The present invention relates to wheel trim or cover adapted to be applied to the outer sides of vehicle wheels for ornamental and protective purposes.

Still more particularly, the present invention relates to a new and improved marginal cover and retaining structure.

An important object of the present invention is to provide an improved wheel trim or cover.

Another object of this invention is to provide a novel improved ornamental and protective cover of the type which can be easily and conveniently applied by manual pressure to the wheel and which may also be readily removed from the wheel without damaging the cover so that the cover may be again applied to the wheel with the cover retaining structure being as efficient as before in its manner of cooperation with the wheel.

Still another object of this invention is to provide a new and improved cover with marginal retaining extensions having spring steel characteristics although the material from which the cover is made is merely stainless steel or other suitable metallic sheet metal not inherently possessed of spring steel characteristics.

Yet another object of this invention is to provide a new and improved coaction between a wheel cover and a vehicle wheel having retaining means that resist disengagement from the wheel while being subjected to forces during the driving of the vehicle.

Yet another object of this invention is to provide a wheel cover which is capable of effectively and efficiently maintaining itself upon a vehicle wheel and yet which lends itself to economical manufacture with a minimum cost.

A further object of this invention is to provide a new and improved cover construction which allows the cover to be assembled and removed from the wheel with a minimum amount of effort.

Other objects and features of the present invention will more fully become apparent in view of the following detailed description taken in conjunction with the accompanying drawings illustrating therein a single embodiment and in which:

Figure 1 is a side elevation of my wheel structure;

Figure 2 is an enlarged fragmentary cross-sectional view taken substantially on the line II—II of Fig. 1 looking in the direction indicated by the arrows;

Figure 2a is a view similar to Figure 2 showing the action of the cover as it is applied to the wheel; and Figure 3 is an enlarged fragmentary rear elevation of my wheel cover.

A wheel cover 10 (Figs. 1–3) according to the present invention is constructed and arranged to be applied in press-on, pry-off relation to the outer side of a vehicle wheel which may be of the conventional type having a disk spider wheel body 11 carrying a multi-flange drop center tire rim 12 which rim has a generally radially outwardly extending flange 13 terminating in and merging with a curled terminal flange or an axially outwardly turned peripheral rim flange edge 14. The body part 11 is adapted to be bolted onto the axle of a vehicle in a conventional manner such as by directing lugs through openings in the body part 11 and thereafter threading nuts onto the lugs to clamp the body part to the axle.

The tire rim is adapted to support a pneumatic tire and tube assembly, or a tubeless tire 15 as is shown in Figure 2. For inflating the tire, the tire is provided with a valve stem 16 which extends through cover opening 17a as is shown in Fig. 1 so as to be accessible from the outer side of the wheel.

The wheel cover 10 comprises a one piece sheet metal stamp and drawn circular body having a central crown portion 17 for overlying a central portion of the wheel body 11 and merging with an intermediate annular inwardly dished portion 18 from which extends generally radially and axially outwardly an outer annular marginal portion 19 for overlying the tire rim 12.

New and improved means are provided for press-on, pry-off retention of the cover 10 on the wheel. To this end the outer marginal portion 19 of the cover has an underturned generally radially and axially inwardly extending continuous flange 20. Extending generally axially inwardly from the flange 20 at circumferentially spaced intervals are reverse bent resiliently deflectable retaining extensions 21.

It will be noted the outer marginal portion 19 and the continuous annular flange portion 20 are in close axial proximity to one another and are more or less concentrically arranged. To augment and stiffen the outer margin of the cover, an annular rib 22 is provided at the junction of the portions 18 and 19. The retaining means 21 includes generally radially extending curled portions 23 and 24. The curled portion 23 is larger than curled portion 24 and opens axially outwardly while the curled portion 24 opens axially inwardly. Generally at the junction of the curled portions 23 and 24 is provided an annular wheel engaging surface 25 which is adapted to retainingly engage behind the shoulder provided by the curled rim flange terminal 14.

The outer curled portion 24 includes angularly related flanges 26 and 27 (Fig. 3). These flanges 26 and 27 are adapted to nestingly engage with the tip of curled terminal rim flange 14 so as to resist axial inward deflection of the cover to minimize the effect of curbing and to resist damage to the retaining means.

These flanges 26 and 27 also serve to maintain the looped portion 23 in axially spaced relation to the radial rim flange 13.

The cover may be assembled upon the wheel by initially aligning the valve stem 16 with respect to the cover opening 17a and thereafter urging the cover axially inwardly in abutting engagement with the rim 12 (Figure 2a) with the result that the curled portion 23 is progressively radially inwardly deflected by the radially inner outer edge of the curled terminal rim flange 14 until the outer looped portion 24 is in abutting engagement against the cover flange 20. Force may be then applied through the cover margin 19 directly to the curled portion 24 to urge the surface 25 into biting engagement behind the shoulder provided by the rim flange 14. At this point, the tip of the rim flange 14 is engaged on three sides in the recess or pocket defined by the axially inwardly opening curled portion 24.

To effect removal of the cover 10 from the wheel, a suitable pry-off tool may be inserted underneath the cover 10 and upon the application of a pry-off force the cover may be pried from the wheel.

The cover 10 may be made from sheet brass of a suitable alloy or sheet steel, more especially stainless steel of suitable type, and may be worked and formed by stamping and drawing operations. It is contemplated that suitable sheet aluminum may also be used. All of these materials are cold work hardenable and will take a high lustrous polish, while the brass may be nickel plated and the stainless steel may be readily flash chrome plated. Moreover, in the cold working of the cover retaining means as well as the outer marginal looped cover portion defined by the flanges 19 and 20, a high degree of resiliency is attained which is quite advantageous for embodying efficient retaining gripping characteristics in the retaining extensions 21.

Where preferred, the cover may be provided instead of four retaining extensions integrally in one piece therewith, with different numbers of retaining extensions as is desired. Also, each of the extensions 21 including the looped portions are of a reinforced wedge-shape as is shown in Figure 3.

It will be understood that modifications and variations may be effected without departing from the scope of the novel concepts of the present invention.

I claim as my invention:

1. In a wheel structure, a wheel including rim and body parts with the rim having a terminal rim flange, a wheel cover member for overlying disposition upon the wheel including circumferentially spaced resiliently deflectable retaining extensions carried on the underside thereof, said extensions each having a resiliently deflectable flange for biased engagement with the inside surface of the terminal rim flange and with said extensions terminating in successive short stiff flange portions which are in angular relation to one another and which cooperate with the extension in defining a channel for engagement over the tip end of the terminal rim flange, the channel being defined by a generally C-shaped surface having a cross-sectional configuration approximating the peripheral surface configuration of the tip of the terminal rim flange and with the C-shaped surface being snugly engaged with the tip of the terminal rim flange, one of said short stiff flange portions being depressible against the underside of the cover upon biasing the retaining extension against the wheel enabling force to be directly applied to the extensions through the margin of the cover member to facilitate assembly of the cover with the tire rim the short stiff flange portions being springable axially towards and away from the cover during their assembly with the terminal rim flange.

2. The wheel structure of claim 1 further characterized as having its extensions being integral with and underturned from the outer margin of the cover member including first and second looped portions on each of said extensions, said resiliently deflectable flange constituting a leg common to both of said looped portions.

3. In a wheel structure including a multi-flanged stepped tire rim having a radial rim flange and an axially extending arcuate terminal rim flange with an annular rim groove being defined between the radial and terminal rim flanges and with the terminal rim flange having radially inner and outer terminal rim surfaces and an axially outwardly facing terminal rim surface, a wheel cover member for retained disposition upon the wheel including a series of annularly arranged circumferentially spaced resiliently deflectable cover retaining extensions having a diameter normally slightly greater than the radially inner surface of the terminal rim flange, the extension being comprised of radially inner and outer generally curled portions one of which opens generally axially outwardly and the other of which opens generally axially inwardly, the radially inner curled portion being engaged under tension in said groove, the radially outer curled portion having a C-shaped surface which is approximately the same as the peripheral surface configuration of the terminal rim flange and with the C-shaped surface snugly engaged with the radially inner and radially outer terminal rim surfaces as well as the axially outwardly facing terminal rim surface each of the curled portions on each of the extensions being comprised of a relatively thin band of resilient sheet metal adapted to engage the radially inner and outer terminal rim surfaces under resilient tension, the looped portions being springable in unison together towards and away from the axially inner side of the cover member to facilitate camming of said radially outer looped portion over the terminal rim flange into assembly with the wheel.

4. The wheel structure of claim 3 further characterized by the extension including both of the C-shaped portions being generally wedge-shaped in configuration.

5. The wheel structure of claim 3 further characterized by the radially outer curled portion being smaller in cross-sectional configuration than the radially inner curled portion.

6. In a cover structure for a wheel including a rim having an axially outwardly turned peripheral rim flange edge, a metallic circular wheel cover having peripheral loop-like spring retaining means generally behind the wheel cover formed with an axially rearwardly turned edge in radially spaced relation to the spring means proper and thereby defining a pocket therebetween for receiving the rim flange edge therein, the axially inner side of said cover proper being spaced from the loop-like spring retaining means to allow for springing of said loop-like spring retaining means toward the axially inner side of the cover for the camming of said turned edge over said rim flange edge upon pressure of the cover against the wheel.

References Cited in the file of this patent

UNITED STATES PATENTS

| 2,282,588 | Lyon | May 12, 1942 |
| 2,447,021 | Lyon | Aug. 17, 1948 |
| 2,597,010 | Lyon | May 20, 1952 |
| 2,624,638 | Lyon | Jan. 6, 1953 |
| 2,654,637 | Lyon | Oct. 6, 1953 |
| 2,683,631 | Lyon | July 13, 1954 |
| 2,689,539 | Lyon | Sept. 21, 1954 |
| 2,707,449 | Lyon | May 3, 1955 |
| 2,749,186 | Wood | June 5, 1956 |

FOREIGN PATENTS

| 509,850 | Canada | Feb. 8, 1955 |